United States Patent
Takahashi et al.

(10) Patent No.: US 8,258,781 B2
(45) Date of Patent: Sep. 4, 2012

(54) ROTATION SENSOR

(75) Inventors: Toru Takahashi, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 103 days.

(21) Appl. No.: 12/452,182

(22) PCT Filed: Jun. 17, 2008

(86) PCT No.: PCT/JP2008/001552
§ 371 (c)(1),
(2), (4) Date: Dec. 18, 2009

(87) PCT Pub. No.: WO2008/155898
PCT Pub. Date: Dec. 24, 2008

(65) Prior Publication Data
US 2010/0102801 A1    Apr. 29, 2010

(30) Foreign Application Priority Data
Jun. 20, 2007 (JP) ................... 2007-162233

(51) Int. Cl.
*G01B 7/30* (2006.01)
(52) U.S. Cl. ............ 324/207.25; 324/207.2; 324/207.21; 384/448
(58) Field of Classification Search .. 324/207.2–207.25; 384/445–448
See application file for complete search history.

(56) References Cited

U.S. PATENT DOCUMENTS

| | | | |
|---|---|---|---|
| 4,680,543 A | 7/1987 | Kohen | |
| 4,829,245 A | 5/1989 | Echasseriau et al. | |
| 5,011,303 A | 4/1991 | Caron | |
| 5,039,942 A | 8/1991 | Buchschmid et al. | |
| 5,470,157 A | 11/1995 | Dougherty et al. | |
| 5,523,681 A | 6/1996 | Hajzler et al. | |
| 5,594,334 A * | 1/1997 | Sonnerat et al. | 324/173 |
| 5,663,640 A | 9/1997 | Sakamoto | |
| 6,559,633 B1 | 5/2003 | Nachtigal et al. | |
| 6,715,765 B2 * | 4/2004 | Machida | 277/409 |
| 7,197,951 B2 * | 4/2007 | Koyama et al. | 73/865.9 |

(Continued)

FOREIGN PATENT DOCUMENTS
EP    0566946    10/1993

(Continued)

OTHER PUBLICATIONS

English Translation of the Preliminary Report on Patentability dated Jan. 21, 2010 and issued in corresponding International Patent Application PCT/JP2008/001552.

(Continued)

*Primary Examiner* — Arleen M Vazquez

(57) ABSTRACT

A rotation detecting sensor, having excellent sealing capability to prevent water ingress from outside, being so robust that no damage occur in sensor component parts and circuits due to external force and/or thermal strains resulting from self-heating or change in ambient temperature, and inexpensive to manufacture, is provided. The rotation detecting sensor is fixed to a sensor fixing member to be fitted to a wheel support bearing assembly. A sensor unit, including a magnetic sensor element, a cable and a substrate, is fixed to the sensor fixing member through the substrate. A molding segment molded of a molding material bonded with the substrate is provided around the sensor unit. The substrate has a metallic pattern portion formed as a metallic coating on a substrate surface in the vicinity of an electroconductive pattern portion and the molding material is bonded to the metallic pattern portion.

11 Claims, 7 Drawing Sheets

U.S. PATENT DOCUMENTS

| | | | |
|---|---|---|---|
| 2006/0039639 A1* | 2/2006 | Aoki et al. | 384/448 |
| 2007/0253653 A1 | 11/2007 | Shigeoka et al. | |
| 2008/0101740 A1 | 5/2008 | Aoki et al. | |
| 2010/0013463 A1* | 1/2010 | Ozaki et al. | 324/207.2 |
| 2011/0127995 A1* | 6/2011 | Nishikawa et al. | 324/207.14 |

FOREIGN PATENT DOCUMENTS

| | | |
|---|---|---|
| JP | 7-197938 | 8/1995 |
| JP | 09-196946 | 7/1997 |
| JP | 9-288117 | 11/1997 |
| JP | 2000-088984 | 3/2000 |
| JP | 2003-254985 | 9/2003 |
| JP | 2003-287025 | 10/2003 |
| JP | 2003-336654 | 11/2003 |
| JP | 2004-190840 | 7/2004 |
| JP | 2006-258542 | 9/2006 |
| JP | 2008-275490 | 11/2008 |
| WO | 2008/129808 A1 | 10/2008 |

OTHER PUBLICATIONS

U.S. Office Action mailed on Jan. 6, 2011 in a possible related U.S. Appl. No. 12/585,842.

U.S. Office Action mailed on Jun. 10, 2011 in a possible related U.S. Appl. No. 12/585,842.

Chinese Office Action issued Aug. 17, 2010 in corresponding Chinese Patent Application 200880020344.1.

International Search Report issued on Sep. 22, 2008 in corresponding PCT Application No. PCT/JP2008/001552.

Chinese Office Action dated Mar. 12, 2012 issued in related Chinese Patent Application No. 200980131109.6.

U.S. Office Action mailed Jan. 5, 2012 issued in related U.S. Appl. No. 12/585,842.

U.S. Appl. No. 12/585,842, filed Sep. 25, 2009, Takayoshi Ozaki, NTN Corporation.

U.S. Appl. No. 12/737,709, filed Feb. 9, 2011, Kentarou Nishikawa, NTN Corporation.

U.S. Office Action mailed Apr. 9, 2012 issued in related U.S. Appl. No. 12/585,842.

Japanese Notification of Reason(s) for Rejection issued May 1, 2012 in related Japanese Patent Application No. 2007-186495.

Japanese Notification of Reason(s) for Rejection issued May 1, 2012 in corresponding Japanese Patent Application No. 2007-162233.

Japanese Notification of Reason(s) for Rejection issued May 1, 2012 in related Japanese Patent Application No. 2007-084365.

Extended European Search Report dated Jun. 22, 2012 issued in corresponding European Patent Application No. 08720550.6.

U.S. Office Action mailed Jun. 20, 2012 issued in related U.S. Appl. No. 12/585,842.

* cited by examiner

Fig. 6A
Fig. 6B
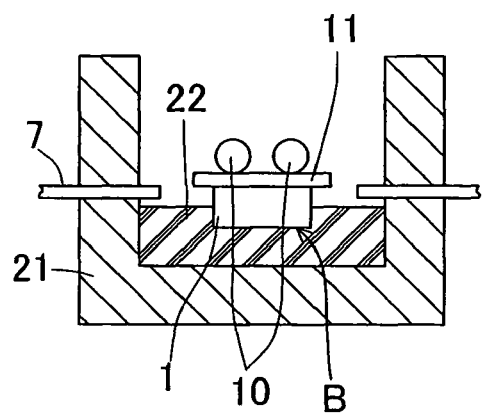
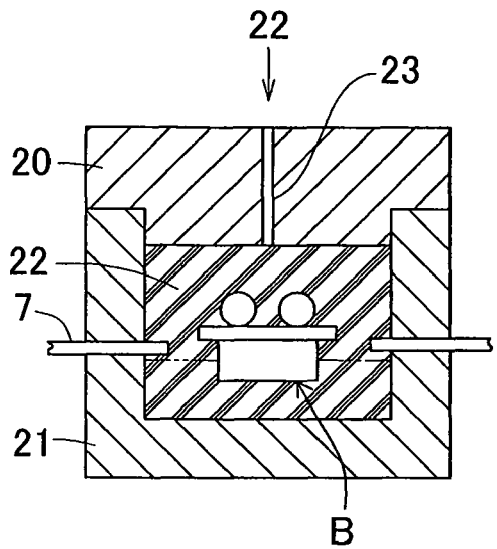
Fig. 7
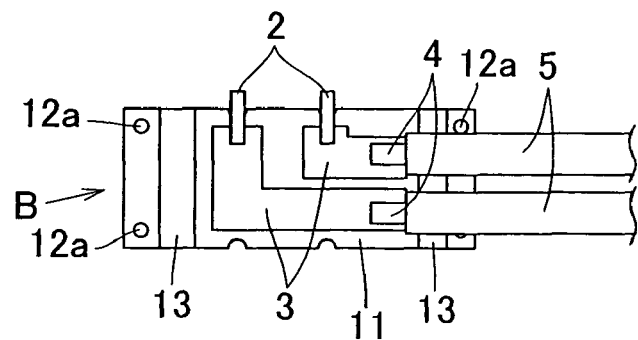
Fig. 8
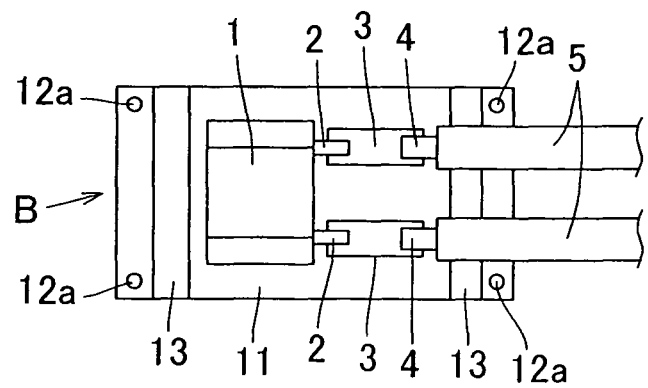

ROTATION SENSOR

CROSS REFERENCE TO RELATED APPLICATIONS

This application claims the benefit under 35 U.S.C. Section 371 of International Application No. PCT/JP2008/001552, filed Jun. 17, 2008, which claimed priority to Japanese Application No. 2007-162233, filed Jun. 20, 2007, in the Japanese Patent Office, the disclosures of which are hereby incorporated by reference.

BACKGROUND OF THE INVENTION

1. Field of the Invention

The present invention relates to a rotation detecting sensor which can be used as an ABS sensor in, for example, an automotive vehicle.

2. Description of the Related Art

The ABS sensor (a wheel axle rotation sensor) that is used as fitted to a hub bearing assembly of an automotive vehicle is generally of a structure including a magnet or a metallic body, provided in a rotating ring of the hub bearing assembly, and a magnetic sensor such as, for example, a magnetic pickup, a Hall sensor or an MR sensor disposed in face-to-face relation with the magnet or metallic body. The ABS sensor is required to have, inter alia, a mechanical strength, a water resistance, a weatherability and a chemical resistance. For this reason, the sensor component parts are over-molded with a resinous material so that they can be used in practice as a sensor unit structure.

One way of over-molding the sensor component parts has been suggested in, for example, the Patent Document 1 listed below, in which the sensor component parts are, after having been fixed in a sensor fixing holder, over-molded with a resinous material.

[Patent Document 1] JP Laid-open Patent Publication No. 2000-88984

SUMMARY OF THE INVENTION

The sensor unit structure for the ABS sensor manufactured in accordance with the prior art overmolding technique has the following problems.

Since the molding material is a resin, adhesion property can not be expected between the sensor component parts and/or component parts built in the sensor fixing holder or the like and the molding material.

There is the possibility that a gap tends to occur between the built-in component parts and the molding material due to the difference in coefficient of thermal expansion that is attributable to self-heating of sensor component parts, which are electronic component parts, and to change in ambient temperature, and, therefore, a problem can be found in water resistance.

Even when plastic deformation takes place in the molding material by the effect of an external force applied to the sensor unit structure, a gap tends to occur between the built-in component parts and the molding material and, therefore, a problem can be found in water resistance.

Since the molding material in the form of a resin has low deforming capability, there is the possibility that in the event that the external force is applied to the sensor unit structure, the built-in component parts may be damaged or deformed by the effect of an external force acting directly on the built-in component parts.

Since the molding material in the form of a resin has an insufficient vibration absorbing capability, a problem can be found in durability against external vibrations.

In the event that an external force acts on a signal cable system, which forms a signal transmitting path from the sensor unit structure to the outside, to such an extent as to result in the signal cable system to bend, such external force may be transmitted to sensor devices inside the sensor unit structure, which will eventually leads to damage.

In order to alleviate the foregoing problems and inconveniences, it has been conceived to fixedly mount various sensor component parts on a substrate to thereby form a sensor unit, which is in turn secured to a sensor fixing member on the side of a hub bearing, with the surroundings of the sensor unit molded with a molding material such as, for example, a thermoplastic elastomer or rubber material. When the rotation detector sensor is provided in this way, most of the foregoing problems and inconveniences can be alleviated. It may, however, be suspected that although the mold material of the rubber system referred to above is bonded to the sensor fixing member, made of a metallic material, by means of welding, adhesion between the substrate and the molding material may not be good depending on the condition of the substrate surface. By way of example, where a portion of an insulating substrate of the substrate is made of a resinous material such as, for example, epoxy resin, adhesion of it with the molding material is not good. In such case, it may possibly occur that water may enter from a contact area in between the sensor fixing member and the molding material toward the substrate when the molding material exfoliates from the sensor fixing member, finally wetting electrode portion of the sensor and/or electroconductive pattern portion on the substrate.

An object of the present invention is to provide a rotation detecting sensor which is excellent in sealing capability to prevent a water ingress from the outside, which is so robust that no damage occur in sensor component parts and circuits around them under the influence of an external force and/or thermal strains resulting from self-heating or change in temperature of the external environment, and, yet, which can be manufactured inexpensively.

The rotation detecting sensor of the present invention is a rotation detecting sensor fixed to a sensor fixing member to be fitted to a wheel support bearing assembly, for detecting rotation of a rotating ring of the wheel support bearing assembly, which includes a sensor unit including a magnetic sensor element for detecting an annular to-be-detected element provided coaxially with the rotating ring, a cable for extracting therethrough an output signal of the sensor element to an outside, and a substrate having the sensor element and one end of the cable both mounted thereon and having an electroconductive pattern portion for electrically connecting an electrode portion of the sensor element and a core wire of the cable with each other, the sensor unit being fixed to the sensor fixing member through the substrate; and a molding segment molded of a molding material in a bonded condition with the substrate and is provided around the sensor unit; in which the substrate is provided with a metallic pattern portion in the form of a metallic coating on a substrate surface and forming a periphery of the electroconductive pattern portion and the molding material is bonded to this metallic pattern portion. For the molding material, a rubber material having an elasticity or a thermoplastic elastomer is suitably employed.

According to the foregoing construction of the present invention, the following functions and effects can be obtained.

Where the sensor unit made up of sensor component parts including the sensor element, the cable and the substrate or the like is molded with the molding material having an elasticity, in the event that an external force and/or vibration act on the rotation detecting sensor, the molding material can absorb such external force and/or vibration to minimize influence which would be eventually brought on the sensor component parts, to thereby protect the sensor component parts.

Where the molding material is in the form of the thermoplastic elastomer or the rubber material having an elasticity, even when thermal expansion and/or thermal contraction of a varying degree occur between the sensor component parts and the molding material as a result of self-heating of the sensor component parts, which are electronic component parts, and/or change in ambient temperature, the difference thereof can be absorbed by the elasticity of the molding material to avoid formation of a gap between the sensor component parts and the molding material, allowing the water resistance to be preserved.

If in particular the molding material is chosen to be the rubber material, the adhesion property between the molding material and metal used in the sensor component parts is feasible and the water resistance can be secured accordingly.

Since the substrate surface, which is a periphery to the electroconductive pattern portion on the substrate is provided with the metallic pattern portion and since the metallic pattern portion is made of a metallic material, the adhesion property with the molding material is feasible. For this reason, even when a portion of an insulating substrate of the substrate will not be bonded with the molding material, or even though it is a material that does not exhibit a good adhesion property, the substrate and the molding segment can be firmly fixed together at a site of the metallic pattern portion. For this reason, even though water ingresses in between the sensor fixing member and the molding segment, there is no possibility that the water ingresses earlier than in the metallic pattern portion and, therefore, an undesirable deposit of the water on and around the electroconductive pattern portion can be prevented.

The metal forming the metallic pattern portion can be the same as that used to form the electroconductive pattern portion on the substrate, for example, copper or a copper alloy. In such case, when the electroconductive pattern portion is to be formed of a conductive foil laminated sheet by the use of a printing technique, the metallic pattern portion can be formed simultaneously with the electroconductive pattern portion and, hence, the productivity is high.

Where the molding material is a rubber material, the molding referred to above may be carried out by the use of a die assembly. In such case, the die assembly may be made up of an upper die and a lower die, and the molding segment may be formed by means of a compacting molding by inserting the sensor unit and a molding material in the form of a rubber material in between the upper die and the lower die and applying a pressure between the dies while the upper die and the lower die are heated.

When the compacting molding using the die assembly is employed to form the molding segment, a substantial number of rotation detecting sensors can be manufactured at one molding and, therefore, the cost can be reduced. Also, if the die assembly is made up of the upper die and the lower die, positioning of the sensor unit can be achieved easily and a proper pressure can be applied to the molding material. It is to be noted that in the molding performed by an injection molding, a nozzle for injecting a melted resin, a runner for guiding the melted resin towards a cavity portion where a molded article is formed, and an inflow port (gate) leading to the cavity portion are required. In order for the melted resin, then flowing therethrough, to flow smoothly to thereby increase the yield, the proper number of the rotation detecting sensor to be manufactured per one time is considered to be several pieces to some ten pieces and, thus, the number of products that can be manufactured at one time is limited. In contrast thereto, the molding by means of the compacting molding is effective to manufacture a substantial number of the rotation detecting sensors at one time.

Where the molding material is a thermoplastic elastomer, the molding referred to above may be carried out by means of an injection molding using a die assembly. In such case, the molding segment may be formed by means of an injection molding by inserting the sensor unit into the die assembly and injecting a thermoplastic elastomer into the die assembly.

Even when the molding material is a rubber material, the molding referred to above may be carried out by means of an injection molding. In such case, the molding segment can be injection molded by inserting the sensor unit into the die assembly and injecting the rubber material into the die assembly.

Where the molding segment is molded by means of the injection molding, the manufacture is easy to achieve and the productivity is excellent.

Also, where the molding material is a rubber material, the molding referred to above may be carried out by the use of a die assembly made up of an upper die and a lower die and the molding segment may formed by means of an injection molding by inserting the sensor unit and a rubber material into one of the upper die and the lower die of the die assembly and injecting a rubber material from the other of the dies.

Where the molding segment is molded in this way, such a function and such an effect that the positioning of the sensor unit can be easily achieved by inserting the sensor unit and the rubber material inserted beforehand in one of the upper die and the lower die can be obtained, in addition to functions and effects similar to those afforded by the molding using the previously described injection molding itself.

For the sensor element, a Hall element, a magnetoresistive effect element (MR element), a giant magnetoresistive effect element (GMR element), a tunnel magnetoresistance element (TMR element), or a coil can be employed. The use of any of those elements can result in a favorable rotation detecting sensor.

It is recommended for the sensor fixing member to be fitted to a stationary ring or its peripheral member of the wheel support bearing assembly.

Where the sensor fixing member is fitted to the stationary ring or its peripheral member of the wheel support bearing assembly, there is no need to employ any additional member for the fixture of the rotation detecting sensor and the structure can therefore be simplified.

The sensor fixing member may concurrently serve as a covering for covering an end face of the wheel support bearing assembly.

Even in this case, there is no need to employ any additional member for the fixture of the rotation detecting sensor and the structure can therefore be simplified.

In a condition in which the substrate is fixed to the sensor fixing member, the metallic pattern portion is preferably arranged between a position of contact between the sensor fixing member and the substrate and the electroconductive pattern portion separately. If the metallic pattern portion is arranged so as to surround the electroconductive pattern portion, it is further preferable.

In the even that exfoliation occurs between the sensor fixing member and the molding segment, water such as, for example, rain sticking to a surface of the sensor fixing member will ingress in between the sensor fixing member and the molding segment. The water so entering will move from the position of contact between the sensor fixing member and the substrate towards the substrate. Accordingly, if the metallic pattern portion for the protection purpose is positioned between the electroconductive pattern and the position of contact between the sensor fixing member and the substrate, an undesirable ingress of water into the electroconductive pattern and their vicinities can be effectively avoided by an effect of adherence between the metallic pattern portion and the molding material. Also, since the metallic pattern portion is arranged so as to surround the electroconductive pattern, an undesirable ingress of water from anywhere other than the position of contact between the sensor fixing member and the substrate can be avoided.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 6A is an explanatory diagram showing a further different method of molding the molding material;

FIG. 6B is an explanatory diagram showing a further different method of molding the molding material;

FIG. 7 is a front elevational view showing a different connection between the sensor element, the cable and the substrate;

FIG. 8 is a front elevational view showing a further different connection between the sensor element, the cable and the substrate;

DETAILED DESCRIPTION OF THE EMBODIMENTS

Figure 1A:
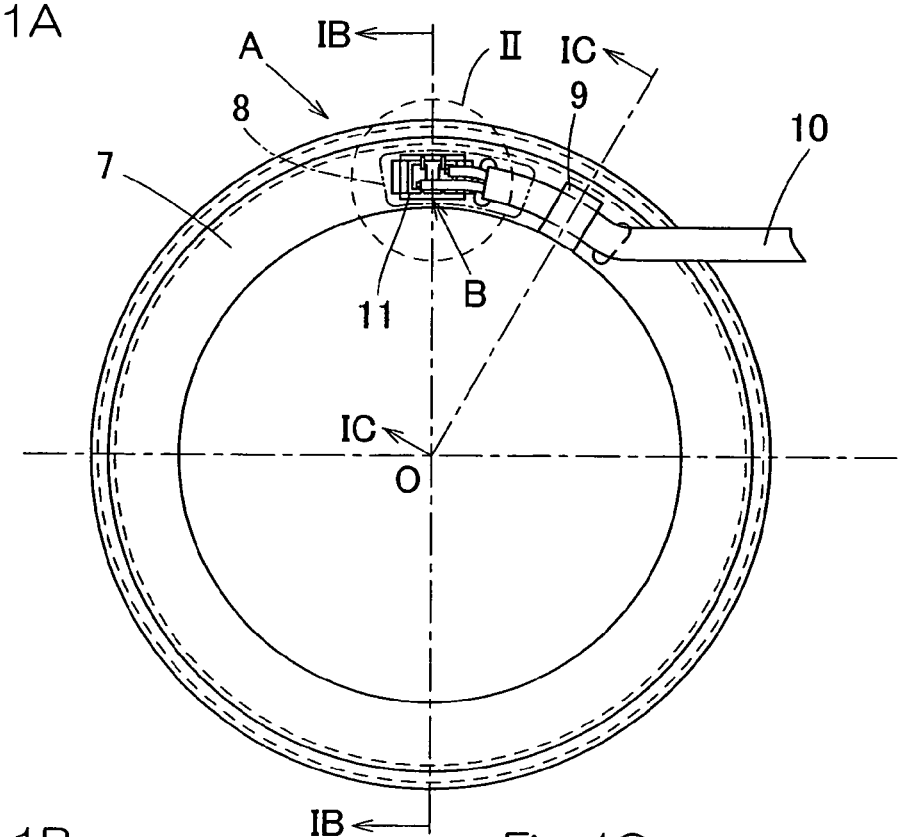
FIG. 1A is a front elevational view showing a rotation detecting sensor according to an embodiment of the present invention.
Figure 1B:
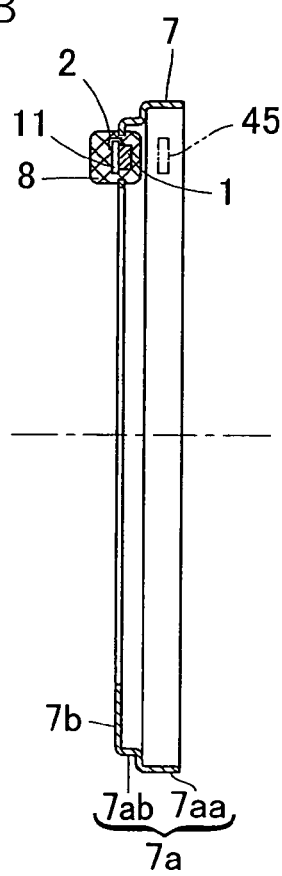
FIG. 1B is a cross sectional view taken along the line IB-IB in FIG. 1A.

A preferred embodiment of the present invention will be described in detail with particular reference to FIGS. 1A to 1C to FIGS. 3A and 3B. A rotation detecting sensor A shown therein is of a type, in which a sensor unit B including a plurality of sensor component parts is fixed to a sensor fixing member 7 and a periphery of the sensor unit B is molded to provide a molding segment 8. This rotation detecting sensor A is used in combination with a to-be-detected element of, for example, a magnetic encoder 45.

The sensor unit B is made up of a magnetic sensor element 1, a cable 10 for extracting an output signal of the sensor element 1 to an outside and a substrate 11 on which the sensor element 1 and one end of the cable 10 are mounted. The substrate 11 is of a type in which electroconductive pattern portions 3 (best shown in FIG. 3A) are formed on a surface of an insulating substrate made of a resin or the like by means of printed wirings. The sensor element 1 is in the form of, for example, a Hall element, a magnetoresistive effect element (MR element), a giant magnetoresistive effect element (GMR element), a tunnel magnetoresistance element (TMR element), a coil or any other magnetic sensor element. In the illustrated embodiment, the cable 10 has two cable core wires 4, which are sheathed by an insulating coating 5 in an electrically insulated fashion, which coating 5 is in turn covered by a cable covering 6.

The sensor element 1 has electrode portions 2 that are electrically connected with the respective electroconductive pattern portions 3 on the substrate 11, while the core wires 4 of the cable 10 are electrically connected with the respective electroconductive pattern portions 3. Each of the electroconductive pattern portions 3 is made of a metal having a good electroconductivity such as, for example, copper foil. In other words, the electrode portions 2 of the sensor element 1 and the core wires 4 of the cable 10 are electrically connected with each other through the electroconductive pattern portions 3, respectively. The electroconductive pattern portions 3 are provided on an upper surface side of the substrate 11 (shown in FIG. 3A) and the sensor element 1 is mounted on a lower surface side (shown in FIG. 3B) of the substrate 11, and the electrode portions 2 of the sensor element 1 extend from the lower surface side to the upper surface side of the substrate 11 via the outside of the substrate 11. The electrode portions 2 and the electroconductive pattern portions 3 are electrically connected with each other by means of, for example, contact bonding, soldering, heat bonding or any other connecting method. Also, the cable core wires 4 and the electroconductive pattern portions 3 are electrically connected with each other by means of, for example, contact bonding, soldering or any other suitable connecting method.

Figure 3A:
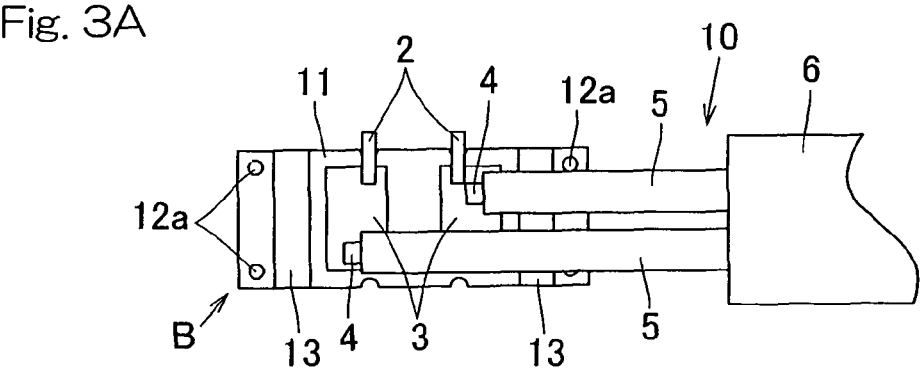
FIG. 3A is a front elevational view showing a connection between a sensor element, a cable and a substrate.
Figure 3B:
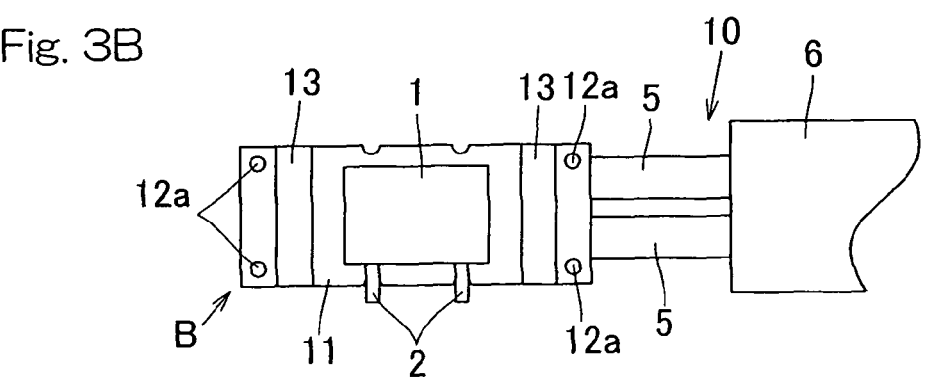
FIG. 3B is a rear view showing the connection shown in FIG. 3A.

The substrate 11 has four corners provided with fixing piece insertion holes 12a into which fixing pieces 12 are inserted respectively (as shown in FIGS. 3A and 3B). Also, a substrate surface longitudinally inwardly of two of the fixing piece insertion holes 12a, which are defined in longitudinally spaced corners of the substrate 11, and in proximity to the electroconductive pattern portions 3 on the upper surface of the substrate 11 and a substrate surface in proximity to the sensor element 1 on the lower surface are provided with metallic pattern portions 13 each in the form of a metallic film. In the case of the illustrated embodiment, the metallic pattern portions 13 are positioned on opposite sides of the electroconductive pattern portions 3 with respect to the direction of arrangement of those electroconductive pattern portions 3 and those metallic pattern portions 13 are each rendered to be in the form of an elongated stripe elongated in a direction perpendicular to the direction of arrangement referred to above, with the opposite ends thereof extending to respective end portions of the substrate 11. The metallic pattern portions 13 are arranged between the electroconductive pattern portions 3 and peripheries of the fixing piece insertion holes 12a, which are positions at which they are held in contact with the sensor fixing member 7 on the substrate 11.

The metallic pattern portions 13 are each in the form of a metallic coating of the same material as that of the electroconductive pattern portions 3 and are formed as respective portions of patterns of a conductive foil that are left on an insulating substrate when the electroconductive pattern portions 3 are formed by means of a printed wiring from a conductive foil laminated sheet in which conductive foils are laminated on the insulating substrate. Because of this, the electroconductive pattern portions 3 and the metallic pattern portions 13 may be formed simultaneously and, hence, the productivity is excellent. The metallic pattern portions 13 are made of a metallic material having a good bondability with a molding material 22 (best shown in FIGS. 4A and 4B to FIGS. 6A and 6B) as will be described later, but it may be copper or a copper alloy that is generally used as a material for the electroconductive pattern portions 3. It is to be noted that the metallic pattern portions 13 may not be made of the same metallic material as that of the electroconductive pattern portions 3 and aluminum, for example, may be used as a material therefor.

Figure 2:
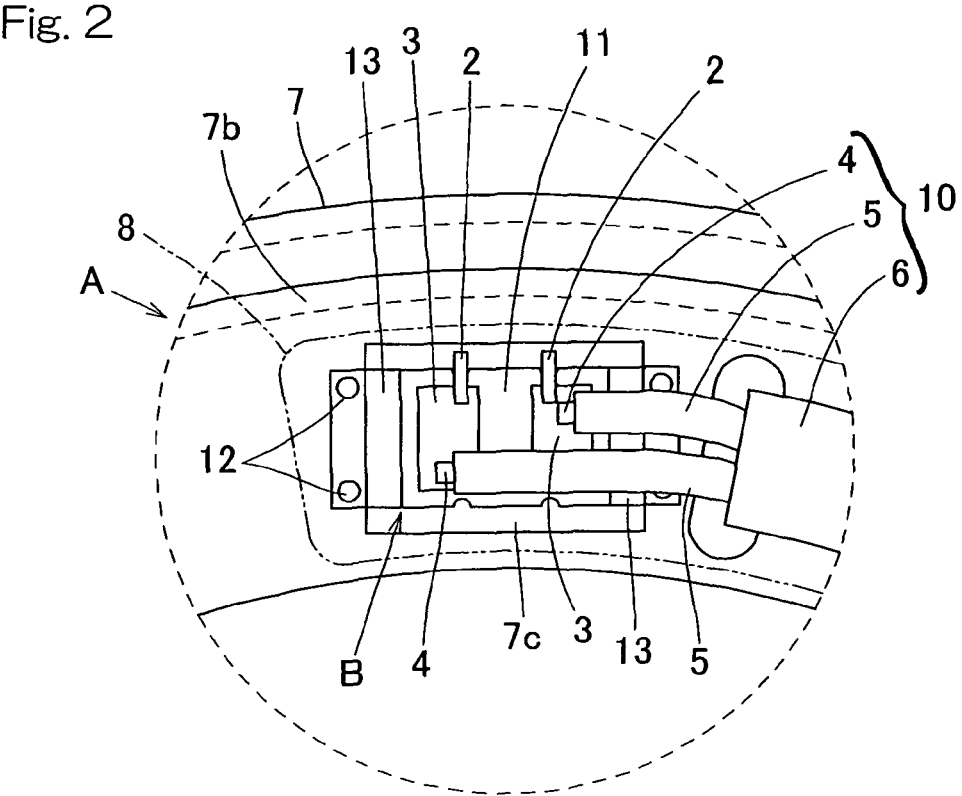
FIG. 2 is an enlarged view showing a portion of FIG. 1A indicated by II.
Figure 13:
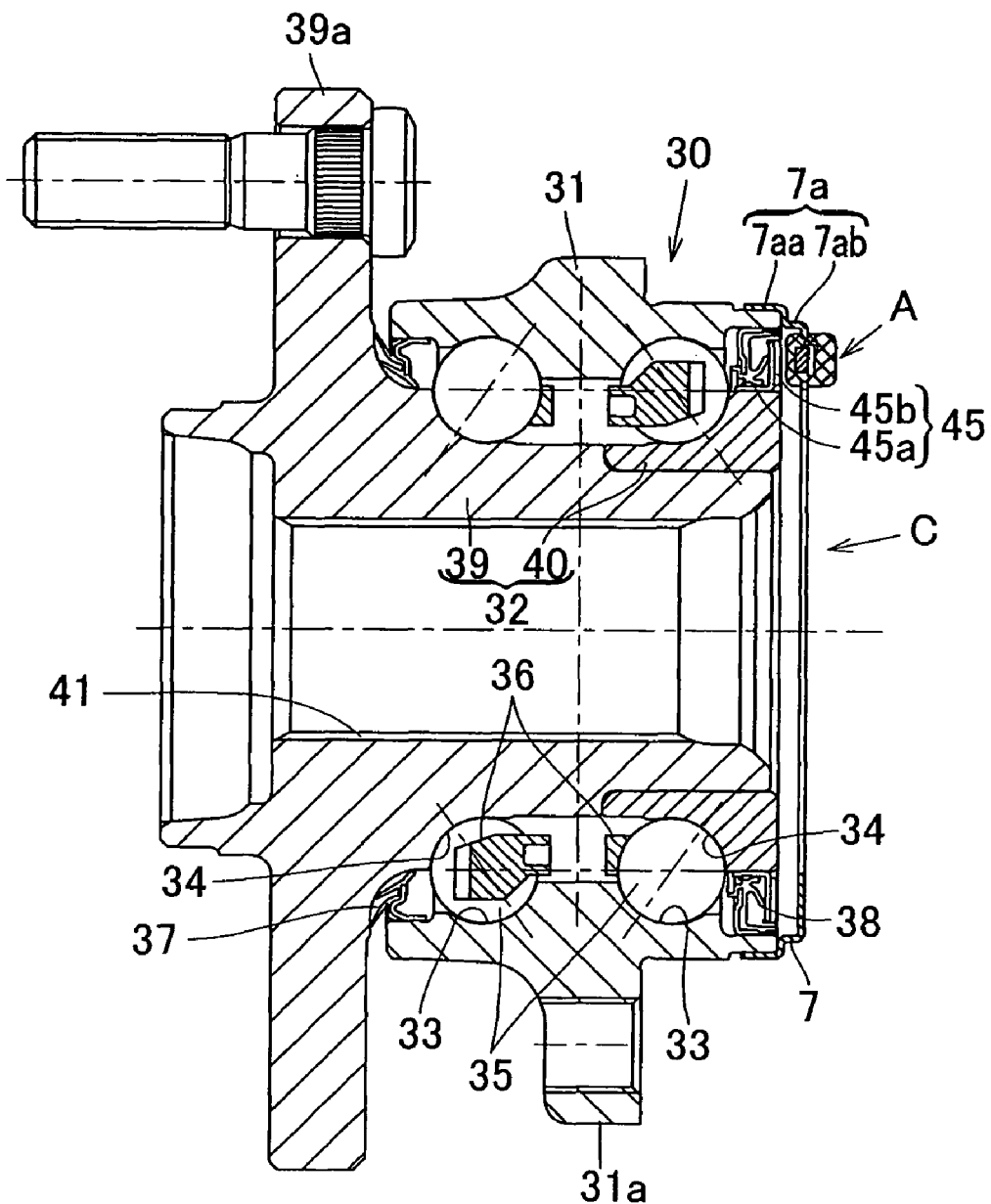
FIG. 13 is a sectional view showing a wheel support bearing assembly provided with the rotation detecting sensor of the present invention.

The sensor fixing member 7 referred to previously is the one that concurrently serves as a covering for covering an end face of the wheel support bearing assembly (as best shown in FIG. 13) and is an annular metal product having its center aligned with the center axis of the wheel support bearing assembly. This sensor fixing member 7 is made up of a stepped cylindrical body 7a having a large diameter portion 7aa and a reduced diameter portion 1ab, a collar portion 7b extending towards an inner diametric side from an end edge of the reduced diameter portion 1ab of the cylindrical body 7aa. As best shown in FIG. 2, when the substrate 11 is fixed to the collar portion 7b of the sensor fixing member 7 by means of fixing pieces 12, the sensor unit B is fixed to the sensor fixing member 7. In the condition in which the substrate 11 is so fixed, the metallic pattern portions 13 are positioned on opposite sides of the electroconductive pattern portions 3 in a direction circumferentially thereof. The collar portion 7b is formed with an opening 7c and the sensor element 1 protrudes through this opening 7c in a direction opposite to the surface of the substrate 11, where it is fixed. For the fixing pieces 12, pins, screws or rivets, for example, can be suitably employed.

Figure 1C:
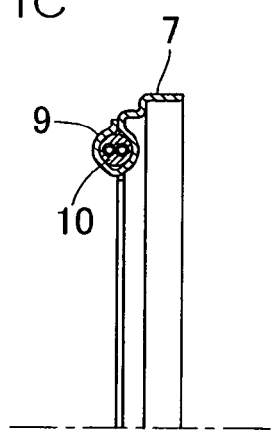
FIG. 1C is a cross sectional view taken along the line IC-IC in FIG. 1A.

Also, as shown in FIGS. 1A and 1C, the sensor fixing member 7 has a portion thereof provided with a clamp member 9 for embracing an end portion of the cable 10 adjacent the sensor unit B side and then fixing it. In the illustrated embodiment, the clamp member 9 is formed integrally with the sensor fixing member 7, but it may be a member separate therefrom.

Figure 4A:
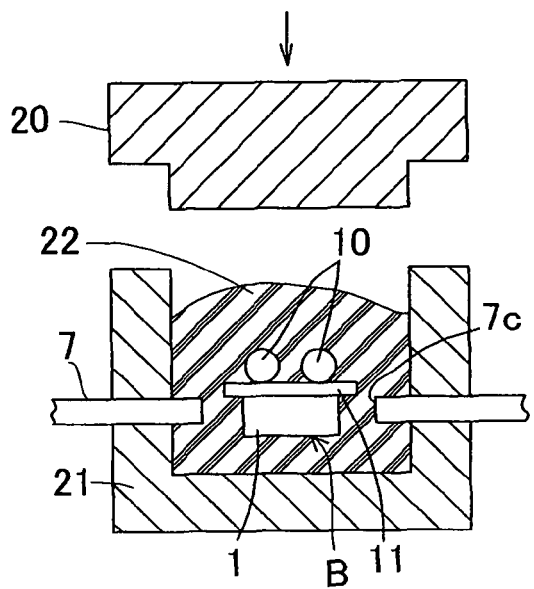
FIG. 4A is an explanatory diagram showing a method of molding a molding material.
Figure 4B:
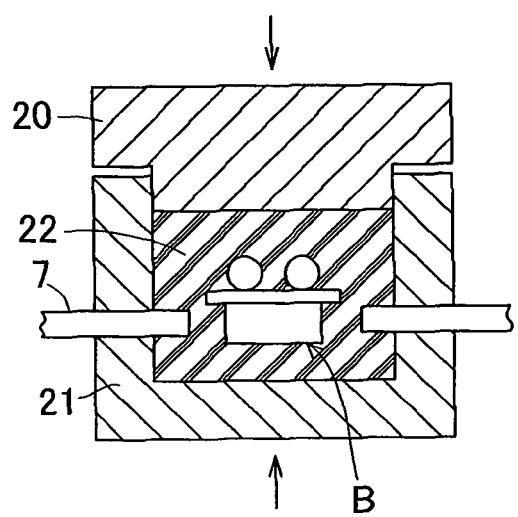
FIG. 4B is an explanatory diagram showing a method of molding a molding material.
Figure 5A:
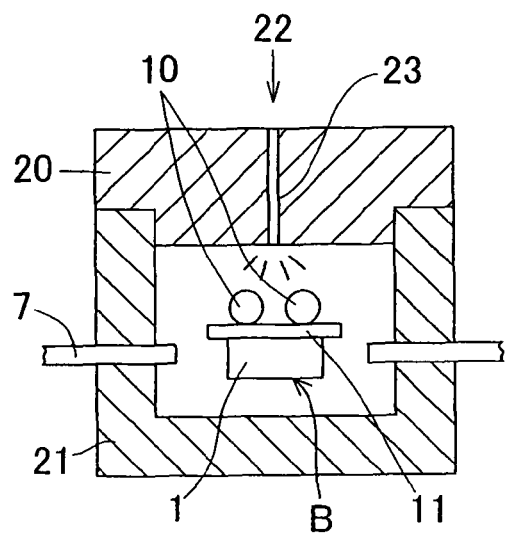
FIG. 5A is an explanatory diagram showing a different method of molding the molding material.
Figure 5B:
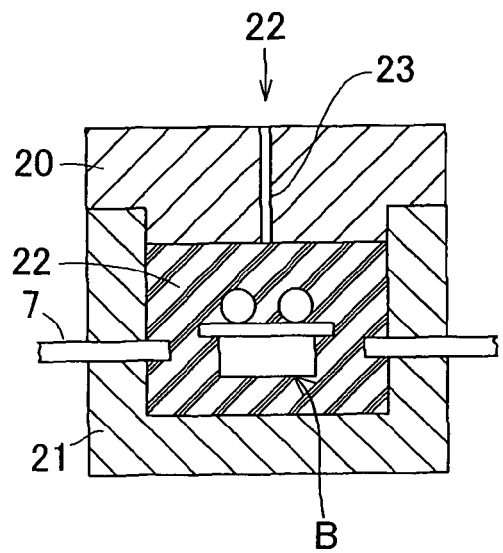
FIG. 5B is an explanatory diagram showing a different method of molding the molding material.

The molding material to be used in molding the sensor unit B is so chosen as to be a material having a rubber elasticity and for this purpose a rubber material or a thermoplastic elastomer may be suitably employed. For the rubber material, nitrile rubber or fluorine rubber is desirable. They are excellent in heat resistance, low temperature characteristic and oil resistance. Any rubber material other than those enumerated above may be employed. For the thermoplastic elastomer, vinyl chloride series elastomers, ester series elastomers or amide series elastomers are desirable. They are excellent in heat resistance and oil resistance.

Where the molding material is a rubber material, molding of the molding material may be accomplished by means of a compacting molding using a die assembly. The compacting molding using the die assembly is performed by inserting the sensor unit B, the sensor fixing member 7 and the molding material 22 in between an upper die 20 and a lower die 21, both forming respective parts of the die assembly, as shown in, for example, FIG. 4A, and then applying a pressure between those dies while the upper and lower dies 20 and 21 are heated as shown in FIG. 4B. Since the substrate 11 is fixed to the sensor fixing member 7, displacement of the sensor unit B by the effect of an internal pressure inside the die assembly 20 and 21 is prevented and the sensor unit B can easily be positioned. Also, where the die assembly is made up of the upper die 20 and the lower die 21, positioning of the sensor unit B is easy to achieve and a proper pressure can be applied to the thermoplastic elastomer or the rubber material. In addition, where the compacting molding using the die assembly is employed to mold the molding segments 8, a substantial number of rotation detecting sensors A can be manufactured at one molding operation and, hence, the cost can be reduced.

Where the molding material is a thermoplastic elastomer, it is preferred that the molding of the molding material is carried out by means of an injection molding using a die assembly. The injection molding using the die assembly is performed by inserting the sensor unit B and the sensor fixing member 7 in a separable die assembly 20 and 21, as shown in, for example, FIG. 5A, and injecting the molding material 22 into the die assembly 20 and 21 through a molding material injecting hole 23 defined in the die assembly 20 to thereby mold the molding material 22 as shown in FIG. 5B. Referring to FIG. 5A, the sensor unit B is fixed at a predetermined position by the sensor fixing member 7. Even where the molding material is a rubber material, the molding can be accomplished similarly by means of the injection molding. The molding by means of the injection molding is excellent in that the manufacture is easy and the productivity is excellent.

Also, where the molding material is a rubber material, the molding material may be molded by a method shown in FIGS. 6A and 6B. In other words, using a die assembly comprised of an upper die 20 and a lower die 21, as shown in FIG. 6A, the sensor unit B, the sensor fixing member 7 and the molding material 22 are inserted beforehand into one of the upper and lower dies (for example, the lower die 21 in the illustrated instance) and, then, as shown in FIG. 6B, the molding material 22 is injected into the die assembly 20 and 21 through a molding material injecting hole 23 defined in the other of the dies (i.e., the upper die 20 in the illustrated instance), followed by injection molding of the molding material 22. When the molding segment 8 is so molded in this way, such a function and such an effect that the positioning of the sensor unit B can be easily achieved by inserting the sensor unit B and the molding material 22 beforehand in the lower die 21 can be obtained, in addition to functions and effects similar to those afforded by the molding using the previously described injection molding itself.

Due to the molding of the above described molding material, the molding material 22 adheres to the sensor fixing member 7, the electroconductive pattern portions 3 in the substrate 11 and the metallic pattern portions 13. This adherence may result from fusion in which the molding material 22 is fused or from the use of a bonding agent. In particular, it is preferred that adherence to the metallic pattern portions 13 should result in firm bonding.

Since the rotation detecting sensor A of the construction described above is of a design in which the sensor unit B is molded with the molding material 22 in the form of the rubber material or the thermoplastic elastomer, both having an elasticity, in the event that a vibration or an external force acts on the rotation detecting sensor A, such vibration or external force can be absorbed by the molding segment 8 to minimize influences extended to the various sensor component parts of the sensor unit B and, therefore, the sensor component parts can be protected. Also, since the molding segment 8 is made of the rubber material or the thermoplastic elastomer, both having an elasticity, even when thermal expansion and/or thermal contraction of a varying degrees occurs between the sensor component parts and the molding segment 8 as a result of self-heating of the sensor component parts, which are electronic component parts, and/or change in ambient temperature, the difference thereof can be absorbed by the elasticity of the molding segment 8 and, therefore, formation of a gap between the sensor component parts and the molding segment 8 can be avoided, allowing the water resistance to be preserved. In particular, by employing rubber material as the molding material 22, the molding segment 8 and the metal portion of sensor component parts can have excellent adherence property so that the water resistance therebetween can be maintained.

Since the molding material 22 is made to adhere to the metallic pattern portions 13 provided on the substrate surface, which is in proximity to the electroconductive pattern portions 3 on the upper surface of the substrate 11, and the substrate surface which is proximate to the sensor element 1 on the lower surface of the substrate 11, the substrate 11 and the molding segment 8 can be firmly fixed together at sites of the metallic pattern portions 13. For this reason, formation of a gap resulting from exfoliation will hardly occur between the sensor fixing member 7 and the molding segment 8. In the event that water ingresses in between the sensor fixing member 7 and the molding segment 8, it will not ingress beyond the metallic pattern portions 13 and, therefore, an undesirable deposition of water on the electrode portions 2 of the sensor element 1, the electroconductive pattern portions 3 and the cable core wires 4 can be avoided.

Since the metallic pattern portions 13 are arranged between the vicinity of the fixing piece insertion holes 12a, which are positions of contact of the sensor fixing member 7 with the substrate 11, and the electroconductive pattern portions 3, an undesirable ingress of water into the electroconductive pattern elements 3 and their vicinities can be effectively avoided by an effect of adherence between the metallic pattern portions 13 and the molding material 22. Also, since the metallic pattern portions 13 are arranged so as to surround circumferential opposite sides of the electroconductive pattern portions 3, an undesirable ingress of water from the circumferential opposite sides can be avoided. It is to be noted that the metallic pattern portions 13 may be provided not only on the circumferential opposite sides of the electroconductive pattern portions 3, but so as to surround radial directions of the electroconductive pattern portions 3.

Since the sensor fixing member 7 concurrently serves as a covering for the wheel support bearing assembly, positioning of the rotation detecting sensor A can be facilitated and the number of component parts can be reduced. Also, since the sensor fixing member 7 is made of a metallic material, in the event that the molding material 22 is the rubber material, the adhesion property between the sensor fixing member 7 and the molding segment 8 is feasible and the rotation detecting sensor A in its entirety can be assembled in a robust structure.

Since a portion of the cable 10 proximate to the end thereof adjacent the sensor unit B side is fixed to the sensor fixing member 7 by means of the clamp member 9, the clamp member 9 can support a load in the event that an external force is applied to the cable 10, and, therefore, transmission of load to the sensor unit B and the molding segment 8 can be avoided.

Figure 9:
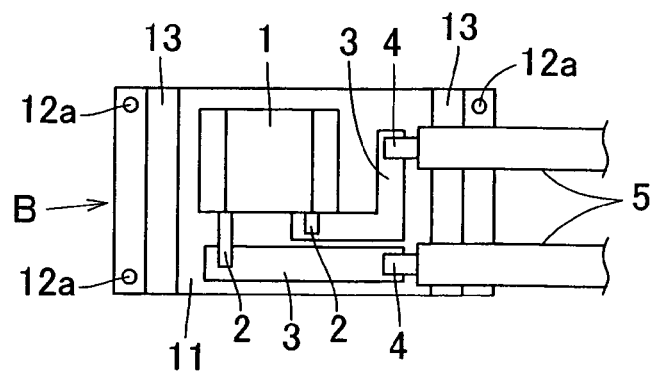
FIG. 9 is a front elevational view showing a still different connection between the sensor element, the cable and the substrate.
Figure 10:
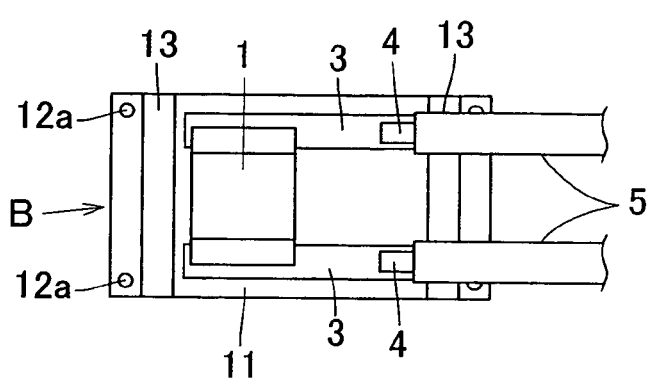
FIG. 10 is a front elevational view showing a still further different connection between the sensor element, the cable and the substrate.
Figure 11A:
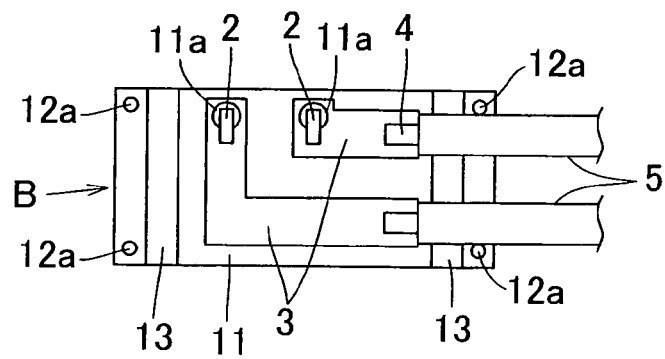
FIG. 11A is a front elevational view showing a yet further different connection between the sensor element, the cable and the substrate.
Figure 11B:
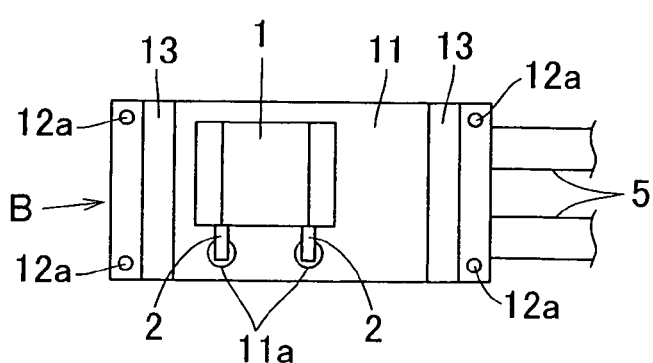
FIG. 11B is a rear view showing the yet further different connection between the sensor element, the cable and the substrate.

FIG. 7 to FIGS. 11A and 11B illustrate different structures of electrically connecting the electrode portions 2 of the sensor element 1 and the cable core wires 4 together. FIG. 7 illustrates an example, in which the respective shapes of the electroconductive pattern portions 3 employed in the embodiment shown in and described with reference to FIGS. 1A to 1C to FIGS. 3A and 3B are modified so that the two cable core wires 4 can be connected respectively with the electroconductive pattern portions 3 at the same positions in a line direction of the cable core wire 4. FIGS. 8 and 9 similarly illustrate respective examples, in which the sensor element 1 and the electroconductive pattern portions 3 are provided on the same surface of the substrate 11. FIG. 10 illustrates an example, in which without the electrode portions provided in the sensor element 1, the sensor element 1 is connected directly with the electroconductive pattern portions 3. FIGS. 11A and 11B illustrate an example, in which in the event that the sensor element 1 and the electroconductive pattern portions 3 are provided on different surfaces of the substrate 11, respectively, throughholes 11a are defined in the substrate 11 and the electrode portions 2 of the sensor element 1 are passed through those throughholes 11a. The electrode portions 2 of the sensor element 1 and the cable core wires 4 may be electrically connected with each other according to any one of the foregoing connecting structures shown in and described with reference to FIGS. 3A and 3B and FIGS. 7 to 11A and 11B and the right connecting structure may be selected in consideration with various conditions. In any case, the metallic pattern portions 13 are provided on a substrate surface which is a vicinity of the sensor element 1 or the electroconductive pattern portions 3.

Figure 12A:
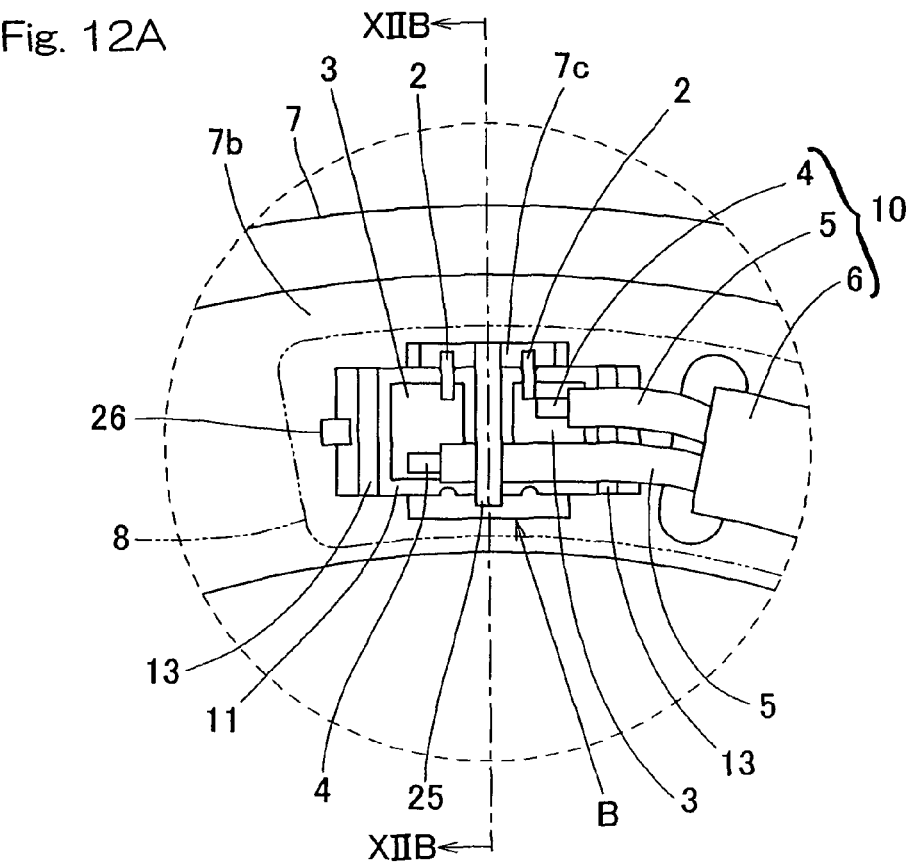
FIG. 12A is a fragmentary enlarged front elevational view showing a rotation detecting sensor, which employs a different method of fixing the substrate to a sensor fixing member.
Figure 12B:
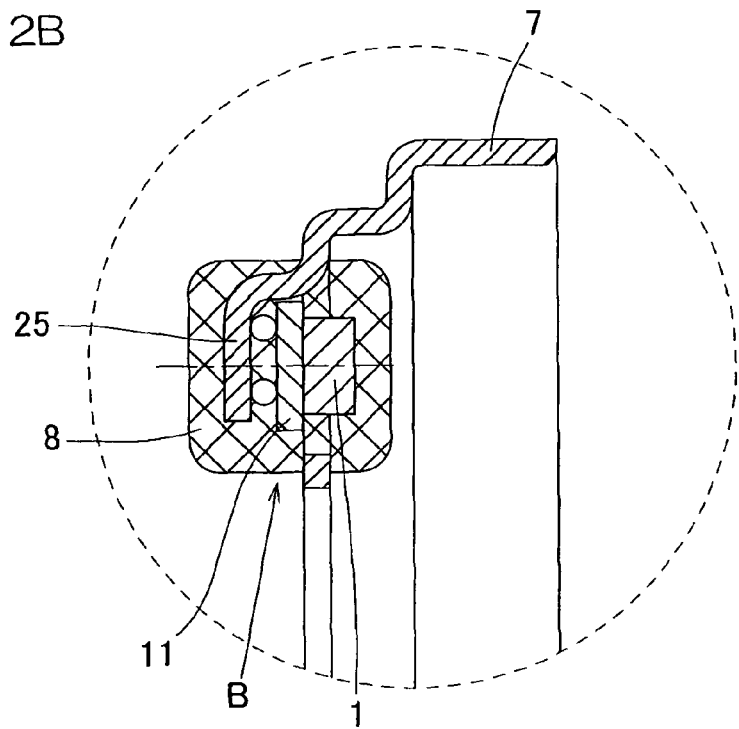
FIG. 12B is a cross sectional view taken along the line XIIB-XIIB in FIG. 12A.

FIGS. 12A and 12B illustrate a different structure of fixing the substrate 11 to the sensor fixing member 7. This fixing structure is such that after projections 25 and 26 have been provided in the sensor fixing member 7, the substrate 11 is sandwiched and, then, fixedly positioned between those projections 25 and 26 and a body of the sensor fixing member 7. According to this fixing structure, no fixing pieces 12 are necessary, the number of component parts can therefore be reduced and any labor required to mount the fixing pieces 12 can be dispensed with.

FIG. 13 illustrates a wheel support bearing assembly equipped with the rotation detecting sensor of the present invention. This wheel support bearing assembly is of a type, in which a rotation detecting sensor and fixing member fitting body C having the rotation detecting sensor A fixed to the sensor fixing member 7 is fitted to a bearing device 30. It is to be noted that in the description that follows, one side of a vehicle body structure laterally away from the longitudinal center thereof in a condition, in which the bearing assembly is mounted on the vehicle body structure, is referred to as "outboard" whereas the opposite side of the vehicle body structure laterally close towards the longitudinal center thereof in the same condition is referred to as "inboard".

The bearing device 30 shown therein includes an outer member 31 having an inner periphery formed with a plurality of rolling surfaces 33, an inner member 32 formed with rolling surfaces 34 in face-to-face relation with the rolling surfaces 33, and a plurality of rows of rolling elements 35 interposed between the rolling surfaces 33 and 34 defined respectively in the outer member 31 and the inner member 32. Each of the rows of the rolling elements 35 are to retained by a retainer 36. Opposite ends of a bearing space delimited between the outer member 31 and the inner member 32 are sealed by sealing devices 37 and 38, respectively.

The outer member 31 serves as a stationary ring and is of one piece construction having an outer periphery formed with a flange 31a so that the bearing device 30 can be fitted through such flange 31a to a knuckle (not shown) extending from a suspension system of an automotive vehicle. The inner member 32 serves as a rotating ring and is made up of a hub axle 39, having a wheel mounting flange 39a defined on an outboard side thereof, and an inner ring 40 mounted on an outer periphery of an inboard end of the hub axle 39. The rolling surfaces 34 referred to above are formed respectively in the hub axle 39 and the inner ring 40. The inner member 32 has its center formed with an axially extending throughhole 41, into which a stem portion (not shown) of one of coupling members of a constant velocity joint is inserted.

One of the sealing devices 37 and 38, for example, the sealing device 38 on the inboard side has a magnetic encoder 45 incorporated therein as a to-be-detected element. The magnetic encoder 45 is of a type, in which a multipolar magnet 45b is provided in a side plate portion of a ring member 45a of an L-sectioned configuration. The ring member 45a is made up of a cylindrical portion, press fitted onto an outer periphery of the inner member 32, and the side plate portion flaring radially outwardly from an inboard end of the cylindrical portion. The multipolar magnet 45b is a member having magnetic poles N and S alternating relative to each other in a direction circumferentially thereof and may be in the form of a rubber magnet, a plastic magnet or a sintered magnet. In the illustrated embodiment, the magnetic encoder 45 concurrently serves a component part of the inboard sealing device 38 and functions as a slinger.

The sensor fixing member 7 referred to previously is fitted to the outer member 31 with a cylindrical portion large diameter portion 7aa mounted on an outer peripheral inboard side of the outer member 31 and with a stepped face between the cylindrical portion large diameter portion 7aa and the reduced diameter portion 1ab held in abutment with an inboard end face of the outer member 31. The sensor fixing member 7 concurrently serves as a covering for an inboard end face of the wheel support bearing assembly. In a condition in which the sensor fixing member 7 is fitted, the rotation detecting sensor A is positioned in face-to-face relation with the magnetic encoder 45.

When the inner member 32, which is the rotating ring, rotates, the sensor element 1 detects the magnetic poles N and S of the magnetic encoder 45 then rotating together with the inner member 32. A detection signal thereof is transmitted to an electric control unit (not shown) of the automotive vehicle through the cable 10 and by this electric control unit the number of rotations is calculated from the detection signal of the sensor element 1.

The rotation detecting sensor according to this embodiment is of a type oriented axially relative to the magnetic encoder, but the present invention may be equally applied to a type oriented radially relative to the magnetic encoder. For the to-be-detected element, a pulse coder may be employed in place of the magnetic encoder.

Also, the magnetic encoder or the pulse coder, which functions as the to-be-detected element, may be fitted to a wheel for the automotive vehicle.

In addition, although in this embodiment the sensor fixing member 7 has been shown and described as fitted directly to the stationary ring, it may be fitted to the stationary ring through a separate member.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rotation detecting sensor fixed to a sensor fixing member to be fitted to a wheel support bearing assembly, for detecting rotation of a rotating ring of the wheel support bearing assembly, comprising:
 a sensor unit including a magnetic sensor element to detect an annular to-be-detected element provided coaxially with the rotating ring, a cable to extract there through an output signal of the magnetic sensor element to an outside, and a substrate having the magnetic sensor element and one end of the cable both mounted thereon and having a plurality of electroconductive pattern portions to electrically connecting an electrode portion of the sensor element and a core wire of the cable with each other, the sensor unit being fixed to the sensor fixing member through the substrate; and
 a molding segment molded of a molding material in a bonded condition with the substrate and is provided around the sensor unit,
 wherein the substrate is provided with a plurality of metallic pattern portions each in the form of a metallic coating on a substrate surface and forming a periphery of the plurality of electroconductive pattern portions, and the molding material is bonded to the plurality of metallic pattern portions, and
 the plurality of metallic pattern portions are positioned on respective opposite sides of the plurality of electroconductive pattern portions with respect to a direction of arrangement of the plurality of electroconductive pattern portions, each of the plurality of metallic pattern portions being in the form of an elongated stripe elongated in a direction perpendicular to the direction of arrangement of the plurality of electroconductive pattern portions, with the opposite ends thereof extending to respective end portions of the substrate.

2. The rotation detecting sensor as claimed in claim 1, wherein the molding is a molding carried out using a die assembly made up of an upper die and a lower die, and wherein the molding segment is formed by means of a compacting molding by inserting the sensor unit and the molding material in the form of a rubber material in between the upper die and the lower die and applying a pressure between the dies while the upper die and the lower die are heated.

3. The rotation detecting sensor as claimed in claim 1, wherein the molding is an injection molding carried out using a die assembly, and wherein the molding segment is formed by means of an injection molding by inserting the sensor unit into the die assembly and subsequently injecting a thermoplastic elastomer into the die assembly.

4. The rotation detecting sensor as claimed in claim 1, wherein the molding is an injection molding carried out using a die assembly, and wherein the molding segment is formed by means of an injection molding by inserting the sensor unit into the die assembly and subsequently injecting a rubber material into the die assembly.

5. The rotation detecting sensor as claimed in claim 1, wherein the molding is a molding carried out using a die assembly made up of an upper die and a lower die and the molding segment is formed by inserting the sensor unit and a rubber material beforehand into one of the upper die and the lower die and subsequently injecting a rubber material from the other of the upper die and the lower die.

6. The rotation detecting sensor as claimed in claim 1, wherein the magnetic sensor element is a Hall element, a magnetoresistive effect element, a giant magnetoresistive effect element, a tunnel magnetoresistance element, or a coil.

7. The rotation detecting sensor as claimed in claim 1, wherein the sensor fixing member is adapted to be fitted to a stationary ring or its peripheral member of the wheel support bearing assembly.

8. The rotation detecting sensor as claimed in claim 1, wherein the sensor fixing member concurrently serves as a covering for covering an end face of the wheel support bearing assembly.

9. The rotation detecting sensor as claimed in claim 8, wherein in a condition in which the substrate is fixed to the sensor fixing member, the plurality of metallic pattern portions are separately arranged between a position of contact between the sensor fixing member and the substrate and the plurality of electroconductive pattern portions.

10. The rotation detecting sensor as claimed in claim 9, wherein the plurality of metallic pattern portions are arranged so as to surround the plurality of electroconductive pattern portions.

11. The rotation detecting sensor as claimed in claim 1, wherein the magnetic sensor element is mounted on one surface of opposite surfaces of the substrate and the one end of the cable is mounted on the other surface of the opposite surfaces, and the plurality of metallic pattern portions are provided on both of the opposite surfaces of the substrate.

\* \* \* \* \*

UNITED STATES PATENT AND TRADEMARK OFFICE
CERTIFICATE OF CORRECTION

PATENT NO. : 8,258,781 B2
APPLICATION NO. : 12/452182
DATED : September 4, 2012
INVENTOR(S) : Toru Takahashi et al.

It is certified that error appears in the above-identified patent and that said Letters Patent is hereby corrected as shown below:

Column 12, Line 42, In Claim 1, delete "connecting" and insert -- connect --, therefor.

Signed and Sealed this
Twenty-sixth Day of February, 2013

Teresa Stanek Rea
*Acting Director of the United States Patent and Trademark Office*